May 22, 1962 E. D. DEININGER 3,036,194
COMBINATION PROTECTOR GRID AND ELECTRIC BROILER ELEMENT
Filed May 1, 1959 2 Sheets-Sheet 1

INVENTOR.
ESTELLE D. DEININGER
BY
Gustave Miller
ATTORNEY

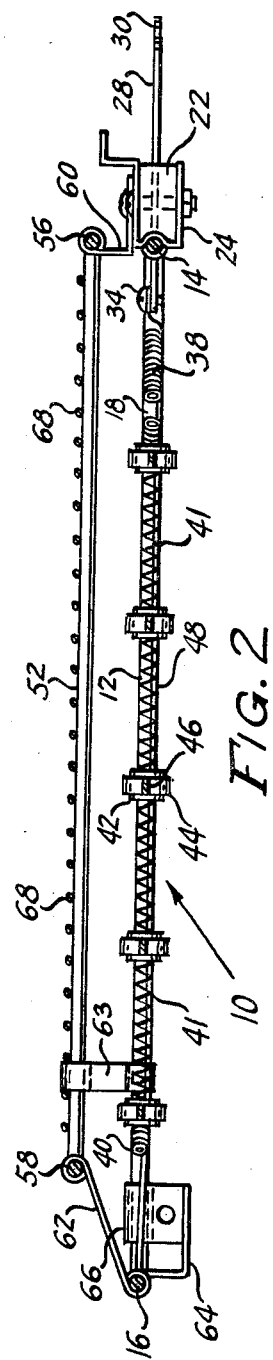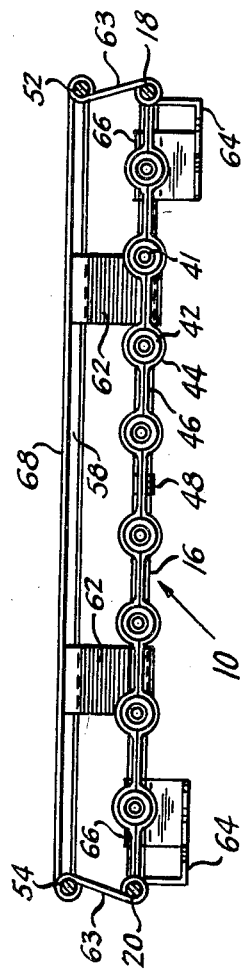

United States Patent Office 3,036,194
Patented May 22, 1962

3,036,194
COMBINATION PROTECTOR GRID AND
ELECTRIC BROILER ELEMENT
Estelle D. Deininger, 5706 Nevada Ave. NW.,
Washington, D.C.
Filed May 1, 1959, Ser. No. 810,398
6 Claims. (Cl. 219—37)

This invention relates to a protection device for electrical broiler elements having open or exposed type coils and it more particularly relates to combination protector grid and electric broiler elements.

Many electric stoves and ranges are provided with broiler elements having the resistor or heating coils exposed, this being recognized by all stove manufacturers engaged in the manufacture of electric stoves and ranges, as being the most efficient method of broiling as well as having the advantage of more closely approximating desirable charcoal broiling. However, these open or exposed coils can be and have been proved dangerous because of inadvertent contact with such coils in the popular use of aluminum foil—a well known conductor of electricity under the right conditions—and also exposes the delicate coils themselves to costly breakage, especially when energized, by parts of utensils, lids, or the like, being used in the oven accidentally coming in contact with the heated coils without the protection of this new protector grid, this breakage a major complaint and concern by all stove manufacturers engaged in the manufacture of electric stoves and ranges ever since the advent of electric appliances for cooking purposes. Without the use of this new protector grid, if there should be inadvertent contact—which has been experienced—between the exposed coils and aluminum foil and any other metal, for example, around the oven door frame and the hands of the person doing the broiling or baking, a circuit is established which may seriously injure a person causing permanent damage to the nervous system, and/or even cause death by electrocution.

Without the use of this new protector grid, even when the switch providing current to the broiler element is turned off, if there should happen to be some undetected defect in the wiring, as has been experienced, or if the circuit should have the exposed wire "hot," it will cause the electrical circuit to be operative so that even in such case, any present easy contact of the exposed coils with aluminum foil held by the hands would complete a closed circuit with unhappy results.

It is one object of the present invention to overcome the above difficulties by providing an electric broiler element which is safeguarded against inadvertent contact with an electrically conductive material.

Another object of the present invention is to provide an electric broiler element, the heating coils of which are not overly exposed to contact, either by cooking utensils, lids, or the like, or aluminum foil in popular use.

Other objects of the present invention are to provide an improved electric broiler element, of the character described, that is easily and economically produced, which is sturdy in construction, and which is highly efficient in operation.

With the above and related objects in view, the present invention consists in the details of construction and combination of parts, as will be more fully understood from the following description, when read in conjunction with the accompanying drawings in which:

FIG. 2 is a sectional view taken on line 2—2 of FIG. 1.

FIG. 3 is a sectional view taken on line 3—3 of FIG. 1.

Figure 1:
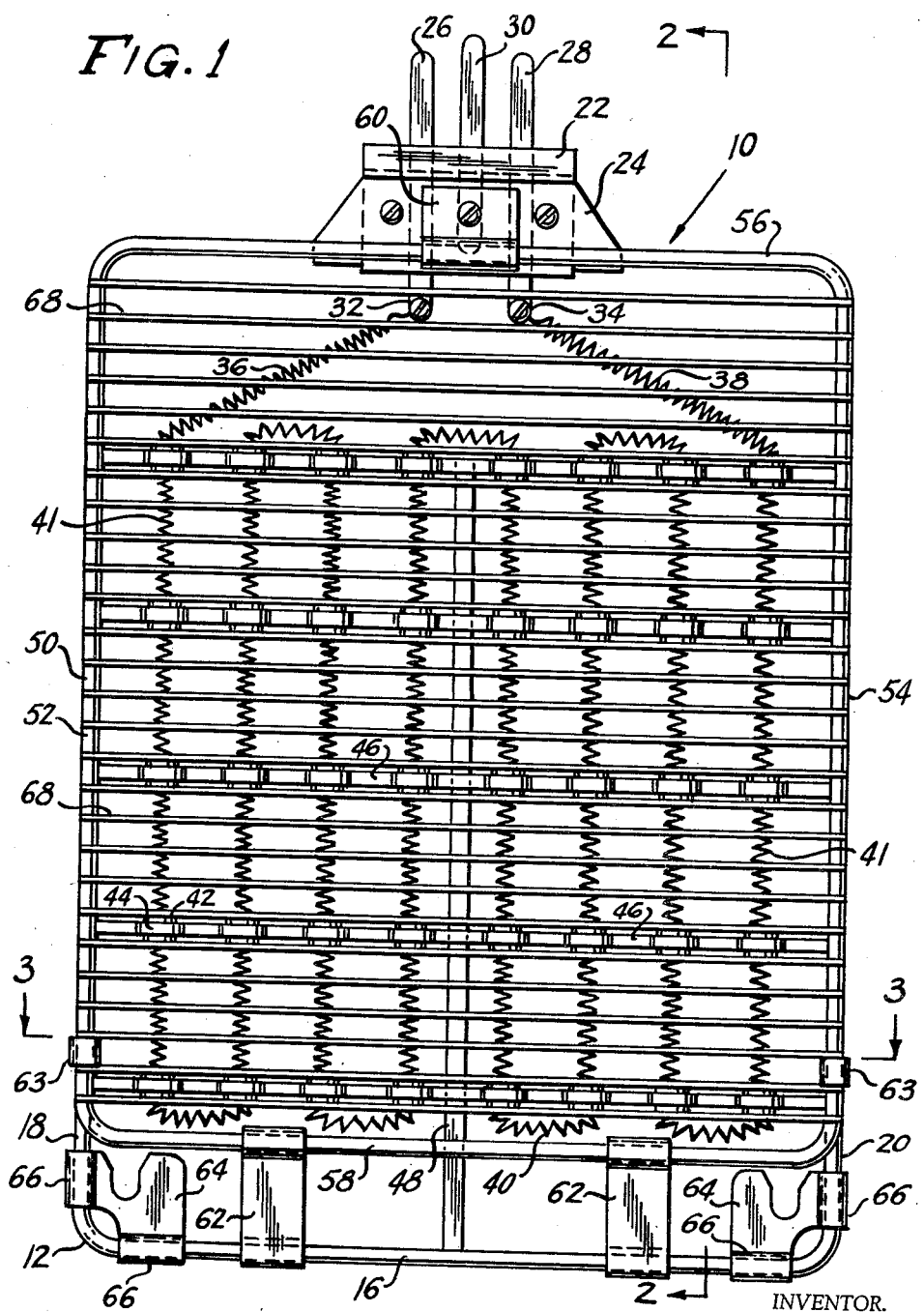
FIG. 1 is a plan view of a device embodying the present invention.

Referring in greater detail to the drawings wherein similar reference characters refer to similar parts, there is shown a broiler unit, generally designated 10, which comprises a generally rectangular frame 12 of metal tubing, the shorter sides being designated 14 and 16 respectively and the longer sides 18 and 20 respectively.

The side 14 is provided with the usual insulating block 22 fixed in the block clamp 24 and provided with the usual electrical connector or terminal prongs 26 and 28 and guide prong 30.

The rearward ends of prongs 26 and 28 are provided with terminal screws 32 and 34 to which are respectively connected the ends 36 and 38 of an electrical resistance heating element 40 having its major parallel strips 41 wound back and forth through insulating spools 42 held in spool sockets 44 mounted on spool socket supports 46. A brace bar 48 helps sustain supports 46 as they extend across the unit from side 18 to side 20.

Mounted parallel with the frame 12 is a generally rectangular frame 50 also made of metal tubing and of the same general size as frame 12 except that it is shorter (as seen at the left hand side in FIGS. 1 and 2).

The frame 50 has two longer sides 52 and 54 and two shorter sides 56 and 58. The side 56 is provided with a bracket 60 connected to the block clamp 24 in any desired manner such as by the existing stud bolt that secures guide prong 30 in place, while at the opposite side, the frame portion 58 is connected to the lower frame portion 16 by metal straps 62 of inclined arrangement. Side metal straps 63 are also provided adjacent the portion 58.

Spacers 64 are connected to the corners of frame 12 beyond the portion 58 of the frame 50, these spacers 64 being each provided with a sleeve or socket 66 at opposed sides to respectively receive the adjacent ends of frame portions 16 and 18 or 20.

Extending transversely across the frame 50, from side 52 to side 54, are a series of grid elements 68 in the form of closely arranged heavy wires or rods. It is also noted that the grid elements 68 are transverse of and not parallel to the parallel strips 41 of broiler element 40. These grid elements 68 not only are sufficiently close to each other to prevent accidental insertion therebetween of a person's fingers but also serve to prevent access to the heating coil 40 of any aluminum foil, cooking utensils, lids, or the like used in conjunction with the broiler unit 10. The frame 50 may be either fixedly or releasably connected to the frame 12.

Although this invention has been described in considerable detail, such description is intended as being illustrative rather than limiting, since the invention may be variously embodied, and the scope of the invention is to be determined as claimed.

Having thus set forth and described the nature of this invention, what is claimed is:

1. In combination, an electrical broiler device comprising a first frame, an electrical heating coil mounted in said frame, said heating coil being arranged in a series of parallel strips connected to each other at alternate ends, said frame having terminal means connected to said heating coil and adapted to be connected to a source of electrical energy, a second frame generally parallel to but spaced from said first frame, means securing said second frame in fixed parallel relationship to said first frame, and a series of closely arranged, parallel grid elements extending across said second frame, said elements being transverse to the series of parallel strips forming the heating coil, the area covered by said series of protecting grid elements being at least equal to the area covered by said strips of said heating coil, said second frame providing a protector device preventing accidental contact with said heating coil on said first frame.

2. The combination of claim 1, said first and second frames being both rectangular, said first frame being longer than said second frame but having one end thereof in alignment with the corresponding end of said second frame.

3. The combination of claim 1, said securing means being removable from said first frame.

4. The combination of claim 1, said securing means for said second frame being fixed to said first frame.

5. In combination, an electrical broiler device comprising a first frame of generally rectangular configuration, a second frame of generally rectangular configuration, said second frame being parallel and spaced from said first frame and having one end in alignment with the corresponding end of said first frame, the opposite end of said second frame being shorter than the corresponding end of the first frame and being connected thereto by inclined metal straps, a heating coil on said first frame arranged in parallel strips having their alternate ends connected, terminal means on said first frame connected to said heating coil and adapted to be connected to a source of electrical energy, and said second frame having a series of closely arranged, parallel grid elements extending transversely to the parallel strips of said heating coil, the major area between said first and second frames being uninterrupted with said frames being connected to each other adjacent the opposite ends thereof.

6. In combination, an electrical broiler device comprising a first frame of generally rectangular configuration, a second frame of generally rectangular configuration, means securing said second frame in closely spaced parallel relationship to said first frame, said securing means comprising metal straps connecting said frames together, a heating coil on said first frame arranged in parallel strips having their alternate ends connected, terminal means on said first frame connected to said heating coil and adapted to be connected to a source of electrical energy, and said second frame having a series of closely arranged parallel grid elements extending transversely to the parallel strips of said heating coil, the major area between said first and second frames being uninterrupted, the area covered by said series of protecting grid elements being at least equal to the area covered by said strips of said heating coil.

References Cited in the file of this patent
UNITED STATES PATENTS

| | | |
|---|---|---|
| 1,624,017 | Shields | Apr. 12, 1927 |
| 2,430,582 | Reich | Nov. 11, 1947 |
| 2,752,476 | Norris | June 26, 1956 |